US010334773B2

(12) United States Patent
Donolo et al.

(10) Patent No.: US 10,334,773 B2
(45) Date of Patent: Jul. 2, 2019

(54) SEED DISPENSER FOR A PRECISION AUTOMATIC SOWER

(71) Applicant: MATERMACC S.P.A., San Vito al Tagliamento (PN) (IT)

(72) Inventors: Pietro Luigi Donolo, Granadero Baigorria (AR); Gastone Tracanelli, Codroipo (IT)

(73) Assignee: MATERMACC S.P.A., San Vito al Tagliamento (PN) (IT)

( * ) Notice: Subject to any disclaimer, the term of this patent is extended or adjusted under 35 U.S.C. 154(b) by 26 days.

(21) Appl. No.: 15/517,684

(22) PCT Filed: Oct. 8, 2015

(86) PCT No.: PCT/IB2015/001908
§ 371 (c)(1),
(2) Date: Apr. 7, 2017

(87) PCT Pub. No.: WO2016/055852
PCT Pub. Date: Apr. 14, 2016

(65) Prior Publication Data
US 2017/0245421 A1 Aug. 31, 2017

(30) Foreign Application Priority Data
Oct. 9, 2014 (IT) .............................. PN2014A0051

(51) Int. Cl.
A01C 7/04 (2006.01)
A01C 7/08 (2006.01)
A01C 7/10 (2006.01)

(52) U.S. Cl.
CPC .............. *A01C 7/046* (2013.01); *A01C 7/081* (2013.01); *A01C 7/102* (2013.01); *A01C 7/04* (2013.01); *A01C 7/042* (2013.01); *A01C 7/044* (2013.01)

(58) Field of Classification Search
CPC ......... A01C 7/046; A01C 7/044; A01C 7/042; A01C 7/04; A01C 7/00; A01C 7/081; A01C 7/08; A01C 7/102; A01C 7/10
See application file for complete search history.

(56) References Cited

U.S. PATENT DOCUMENTS

| 3,608,787 | A | 9/1971 | Grataloup |
| 4,469,244 | A | 9/1984 | Maury |
| 2002/0062771 | A1 | 5/2002 | Unruh et al. |

FOREIGN PATENT DOCUMENTS

| DE | 1931362 A1 | 5/1970 |
| DE | 2701982 A1 | 10/1978 |

(Continued)

Primary Examiner — Christopher J. Novosad
(74) Attorney, Agent, or Firm — Volpe and Koenig, P.C.

(57) ABSTRACT

A single seed dispenser for a precision automatic sower includes a cover for seeds to be distributed joined to a body containing a cavity in communication with an aspirator of the seeds via a conduit inserted in a hole on the body, a distribution disc with holes contained in a compartment delimited by the body and by the cover; a driving disc joined through pins to the distribution disc, both discs being put into rotation by a shaft actuated by an actuator for commanding rotation of the discs; and a selector device for the seeds pivoted on the edge of the body. The selector device includes a plate which presents at least two toothed portions, having teeth of different sizes and a curved sector mounted against the surface of the distribution disc opposite to the plate and has protrusions having inclined surface facing the distribution disc.

11 Claims, 3 Drawing Sheets

(56) References Cited

FOREIGN PATENT DOCUMENTS

| | | | |
|----|----|----|----|
| DE | 102013100113 | A1 | 7/2014 |
| EP | 0046709 | A1 | 3/1982 |
| EP | 0636305 | A1 | 2/1995 |
| FR | 2678472 | A1 | 1/1993 |
| GB | 1162683 | A | 8/1969 |

SEED DISPENSER FOR A PRECISION AUTOMATIC SOWER

TECHNICAL FIELD

The present invention relates to a precision automatic sowing machines, in particular of a pneumatic type, able to sow various vegetable species by distributing single seeds on the ground at regular intervals along a seeding line. In particular, the present invention relates to the seed dispenser with which sowing machines are equipped.

PRIOR ART

Precision sowing machines have various advantages with respect to machines of the universal type; in fact the use thereof eliminates the need for thinning-out the plants at the moment of budding, enables reducing operations of cultivation and reduces waste of seeds. Precision sowing machines are substantially divided into two categories on the basis of the system used for distribution: mechanical sowers and pneumatic sowers.

Numerous patents and patent applications relating to sowers are known. In particular, among the documents relating to pneumatic sowing machines, French patent application FR2678472 describes a machine which distributes seeds due to the action of two rotating discs mounted on and set in action by respective tubes arranged concentrically of one another.

A plurality of holes is fashioned on each disc, arranged parallel to the external edge along circumferences of different dimensions. The seeds, singularly engaged in the holes of the rotating disc by an air current generated by a pneumatic pump, are accompanied up to the point of expulsion.

UK patent GB 1 162 683 described a sowing machine provided with rotating and stationary distribution elements; grooves are present on the rotating distribution means which grooves extend radially for accompanying the seeds to the point of expulsion. The machine further comprises a blower or an aspirator for generating an air flow which adds adhesion of the seeds to the rotating distribution element.

Document EP 0 636 305 also illustrates a precision pneumatic sowing machine comprising a device provided with a pair of rotating perforated discs.

A first disc exhibits, on a first face thereof, a hooking point for a connecting shaft to an actuator and on a periphery of a second face a plurality of fixed pins projecting in an opposite direction to the direction of the connecting shaft of the actuator.

A second disc is characterised by a flat surface on a circular crown of which a plurality of series of holes is present, a first series being able to engage the seeds and a second series being able to engage the fixed pins on the first disc.

The fixed pins, apart from transferring the motion induced by the actuator on the first disc to the second disc, being projecting, also serve to shake the seeds which, by gravity, are deposited on the bottom of the body of the sowing machine, so that they can be brought in proximity of the holes of the second disc where they are captured by the air circulation created by a pump. A comb, installed so as to superpose on the circular crown of the second disc, has a toothing realised so as to cause the seeds to fall if positioned incorrectly in or in proximity of the holes of the second disc. The seeds falling on the bottom of the body are newly shaken by the pins so that they can newly engage in proximity of the holes.

The mechanisms for collecting the single seeds used by these machines, whether perforated cylinders or holed discs, are subject to possible malfunctioning caused by seeds which engage stably in the holes of the rotating surfaces.

In fact, each sowing machine can be used for sowing various types of seed, characterised by various dimensions and shapes, for example, substantially spherical or elongate, with a regular surface of roughness of various breadths and/or depths. In particular, seeds of particularly small dimensions with respect to the average of their species, or elongate, can get jammed in the holes or, indeed, can cross the separator elements, i.e. discs and cylinders, and can even jam the aspirating motor.

Not only, in the case of seeds having an irregular or elongate shape it is possible that, because of the shape, the seeds, while having dimensions within the norm for the vegetable variety thereof, remain stuck in the holes, making the holes unusable.

When these conditions occur the efficiency of the process is reduced, creating empty spaces along the sowing line, and in the most complicated cases the machine has to be shut down to be cleaned.

Further, the machine operator is not always able to detect that seeds have not been sown along the line. If the point where the sowing procedure has not been successful is rapidly identified, the sowing can be repeated in that place, but with a consequent increase in costs and with a waste of time. Otherwise, if the lack of sowing is not identified, there will be empty spaces and losses in production.

To reduce the occurrence of these drawbacks mainly two solutions have been adopted; the first involves the possibility of replacing the discs and time-by-time mounting the discs with holes that are appropriate for the seeds being sown. The second solution involves the installation of further devices, for example as described in patent EP 0 636 305, such as rings having filter holes or grids.

The first solution necessarily requires the machine to be shut down for replacement or cleaning of the surfaces on which the holes have been clogged by jammed seeds having irregular shapes or sizes that are out of the norm.

The second solution is an improvement on the first, and reduces the number of various discs with different hole sections, though there remains the likelihood of machine shut-downs due to the blocking of the holes in the case of seeds having irregular shape.

SUMMARY OF THE INVENTION

The present invention constitutes an improvement with respect to the machine described in patent EP 0 636 305 and the main aim is to realise an improved pneumatic sowing machine able to obviate the specific problem of seeds jammed in the machine discs, thus eliminating the irregularity in the distribution of the seeds and the need to shut the machine down for cleaning the apparatus during the course of the sowing operations.

The main characteristic of the present invention, as specified in claim 1, consists in providing a mechanism that can disengage the seeds from the holes of the disc combined with an element that improves the ordering of the seeds so that they can engage on the rotating distribution disc so that the seeds are accompanied up to the point of expulsion.

BRIEF DESCRIPTION OF THE DRAWINGS

The technical characteristics of the invention will more clearly emerge from the description that follows, by way of non-limiting example, with reference to the accompanying figures which represent one of the possible embodiments in which.

DETAILED DESCRIPTION OF THE INVENTION

Figure 1:
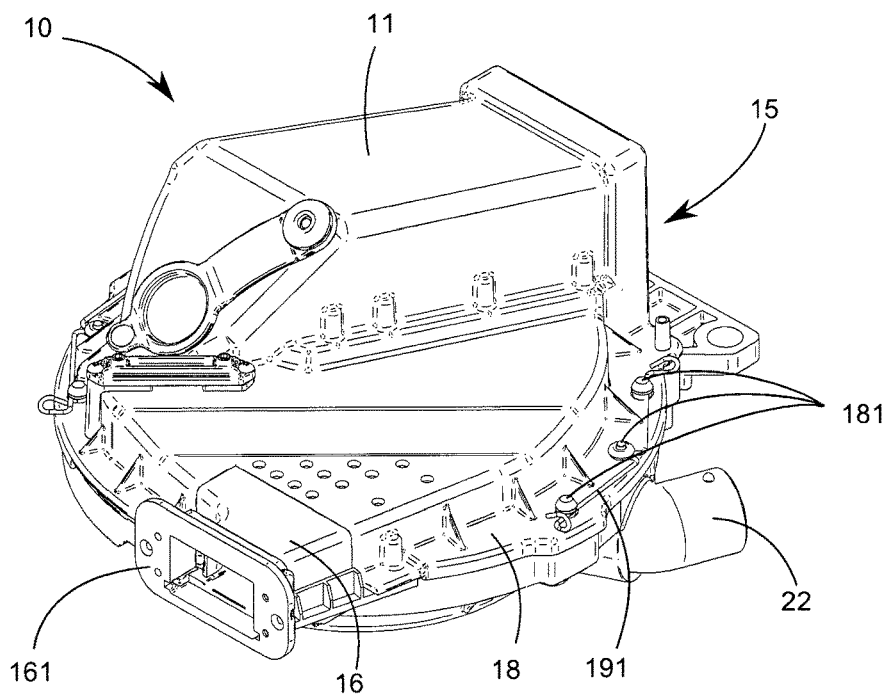
FIG. 1 is a perspective view of the distribution group for a sowing group according to an embodiment of the invention.
Figure 2:
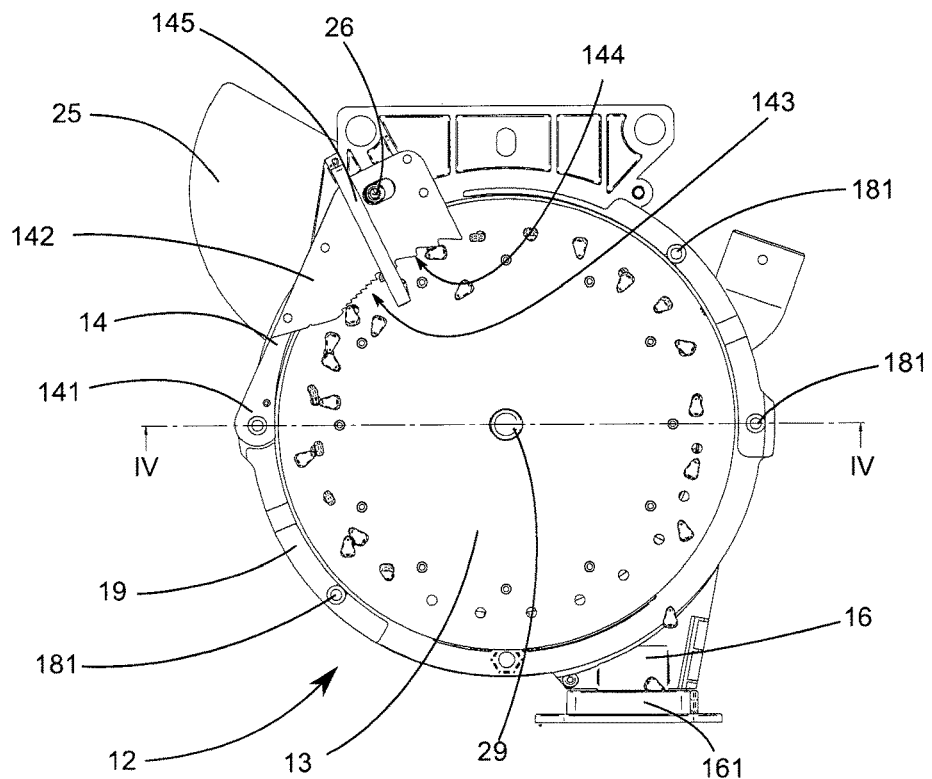
FIG. 2 is an internal detail of a distribution group for a sowing machine of figure from which the body of the seeds has been removed.

The distributor 10 of seeds of the invention, shown in FIG. 1, can be mounted on any known sowing machine, not represented, and is substantially formed by a body 12 made of plastic and a cover 11 which form a compartment internally of which a distribution disc 13 is housed (FIG. 2). A selector device 14 is fixed on the body 12 so as to be partially superposed on the surface of the distribution disc 13.

The cover 11 is provided with a hopper 15 for loading the seeds, and in the upper part and lower part thereof, with a hollow protrusion able to form, with a like part of the body 12 a discharge conduit 15. Further, it exhibits a perforated flange 18 on the perimeter thereof.

A support 161 is installed at a free end of the discharge conduit 16 for a photocell (not illustrated) able to detect passage of the seeds; the photocell is positioned, by means of the support 161, in a point such as not to interfere with the passage of the seeds and is electrically connected to a warning device or to a control device programmed so as to carry out the necessary actions.

These warning and control devices are made according to the prior art and are not shown in the figures.

The body 12 contains an aspirating cavity 24 (FIG. 3) on a wall of which a hole 23 is present in which a conduit 22 is fitted, which connects the cavity 24 to an air aspirating device, of known type and not illustrated.

The body 12 exhibits, on an edge thereof, a flange 19 characterised by dimensions such as to be coupled to the perforated flange 18 of the cover 11.

A first knurled end of locking pins 181 (FIG. 3, detail A) is fixed, for example on the flange 19, destined to engage with a second end thereof in the holes made on the flange 18.

Further, a groove 182 is made at the second end of each of the locking pins 181, contained in a perpendicular plane to the longitudinal axis of the pin.

When the body 12 is flanked to the cover 11 so as to form a closed space, the blocking pins 181 cross the holes of the flange 18, projecting with the free end thereof from the cover 11.

One or more springs 191 engage in the grooves 182 of the projecting ends of the pins 181, acting as holding elements to stabilise the position of the body 12 and the cover 11 (FIG. 1).

Alternatively, the body 12 and the cover 11 can be joined to one another with other known means, such as, purely by way of example, screws closed by bolts or profiled plates which engage in seatings therefor.

Further, in order to guarantee the air seal of the distributor 10 between the two flanges 18, 19, a seal is interposed 51 (FIG. 3) formed, differently to the prior art, in one or two pieces joined so as to form a single plane for improving the seal, simplifying the construction thereof and reducing friction. The distribution disc 13 closes the open side of the aspirating cavity 24 of the body 12 and at least two series of holes 38, 54 are realised on the edge of the disc 13, arranged on concentric circumferences.

Figure 4:
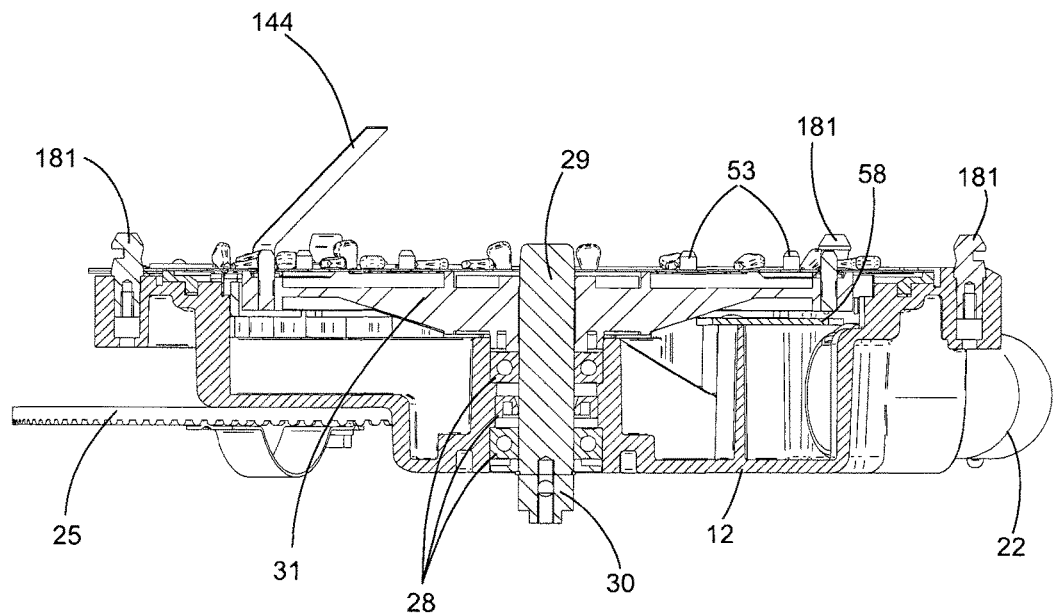
FIG. 4 is a section view according to line IV-IV of FIG. 2.

A hole 27 is included internally of the body 12, in which a shaft 29 is fitted, supported by a bearing-spacer-oil seal group 28 (FIG. 4). The shaft 29 is set in rotation by an actuator, for example by means of a gearing mounted on a first free end (not shown). The other end of the shaft 29 is fixed to a driving disc 31 located in the aspirating cavity 24 internally of the closed volume by the distribution disc 13.

At least a curved element 40 is included so as to be mounted in a corresponding seating 42 made on the body 12. The element 40 has a curvature having a greater radius than the driving disc 31 and the edge thereof preferably follows a circumference which intersects the first series of holes 38 for aspirating the air made on the distribution disc 13. The element 40 can be made of a plastic or metal plate and is arranged perpendicularly to the surface of the distribution disc 13. The element 40 can be replaced by a plate provided with holes, located parallel to a surface of the distribution disc 13 or, alternatively, by a net having suitably calibrated meshes.

The use of separator elements, such as the curved element 40, mounted transversally to the holes 38 of the distribution disc 13, is effective in preventing the passage into the holes of elongate seeds or seeds having a small section, at least up to a certain range of dimensions with respect to the diameter of the holes 38.

This solution enables reducing the number of interchangeable discs, differentiated by the dimensions of the holes made on them, necessary for adapting the sowing machine to the great variety of the seeds to be sown.

The distribution disc 13 is set in rotation by the driving disc 31 which transmits the rotation induced thereon by the shaft 29. In fact, pins 53 are fixed on the edges of the driving disc 31, on the face turned towards the distribution disc 13 and opposite the face in which the shaft 29 projects, which pins 53 engage in the second series of holes 54 made on the distribution disc 13 along a circumference, preferably having a smaller radius than the radius on which the holes 38 are made.

The height of the pins 53 is such that they project from the surface of the distribution disc 13 so as to obtain a triple result; first, by transferring to the distribution disc 13 the motion induced by actuator on the driving disc 31, second, by keeping in position a continuous seal 57 which seals the contact edge between the driving disc 31 and the distribution disc 13, and third, by shaking the seeds which by force of gravity tend to deposit on the bottom of the cover 11. In fact, following the shaking induced by the pins 53, the seeds are moved upwards and when they fall back a part of them is sucked in proximity of the holes 38.

As mentioned in the foregoing, a selector device 14 is installed such as to superpose at least partially on a more external part of the distribution disc 13. The body of the selector device 14 can be realised as a single piece or alternatively can be assembled from several elements appropriately joined to one another. In the embodiment illustrated in FIGS. 2 and 3, two parts can be identified, a first elongate part, or arm 141, a first end of which has a hole in which one of the pins 181 fixed on the flange 19 of the cover 12 is engaged. A plate 142 is fixed on a second end of the arm 141, the edge of which facing the shaft 29 exhibits a toothing made up by two toothed portions 143, 144. A spring 145 is mounted on the plate 142 on the opposite side to the distribution disc 13 which, by forcing on the cover 11 pushes on the plate 142 to keep it in adherence to the surface of the distribution disc 13, thus preventing the seeds from being able to insert between them.

A mechanism is installed externally of the body 12, actuable by an operator charged with the management of the means, for regulating the relative position of the selector device 14 with respect to the distribution disc 13. The mechanism comprises an eccentric pin 26 of the selector device commanded by a manual regulating arm 25 having an indicator for reading the inclination of the selector device 14.

Activating the regulating arm 25 causes the eccentric pin 26 to rotate, modifying the position of the selector device 14 with respect to the position of the holes 38 as a function of the type of seeds to be distributed.

The displacing and regulating of the position of the selector device 14 can also be done using other mechanical elements, such as for example screws, levers, cursors in order to obtain the same effect.

The toothing is made with at least a first and a second toothed portion 143, 144 so that a single seed is engaged on the holes 38, so as to attain the objective of the distributor 10 of depositing a single seed at a time on the ground. In fact, the aspirating effect can be such that a plurality of seeds halt in proximity of a same hole and this fact would lead to several seeds being deposited in a single place.

The first portion 143 of the toothing performs a first selection step, distancing the aspirated seeds in a less stable way. The second portion 144, characterised by teeth of a greater height with respect to the first, is able to apply a more vigorous push so as to detach any seeds in excess still attached in proximity of the holes 38. During and due to the rotation, the seeds not finding a free place to settle in the holes 38 or which have been distanced from the selector device 14 fall onto the bottom of the cover 11 so that they can be recycled.

Further, the aspirating cavity 24 contains an air deviator 58 located in the area close to the discharge conduit 16 so as to interrupt the aspirated air flow which enables the seeds to remain adhering to the distribution disc 13. Following the interruption of the air flow, the force maintaining the seeds against the distribution disc 13 ceases, and the seeds can fall towards the mouth of the discharge conduit 16.

Figure 3:
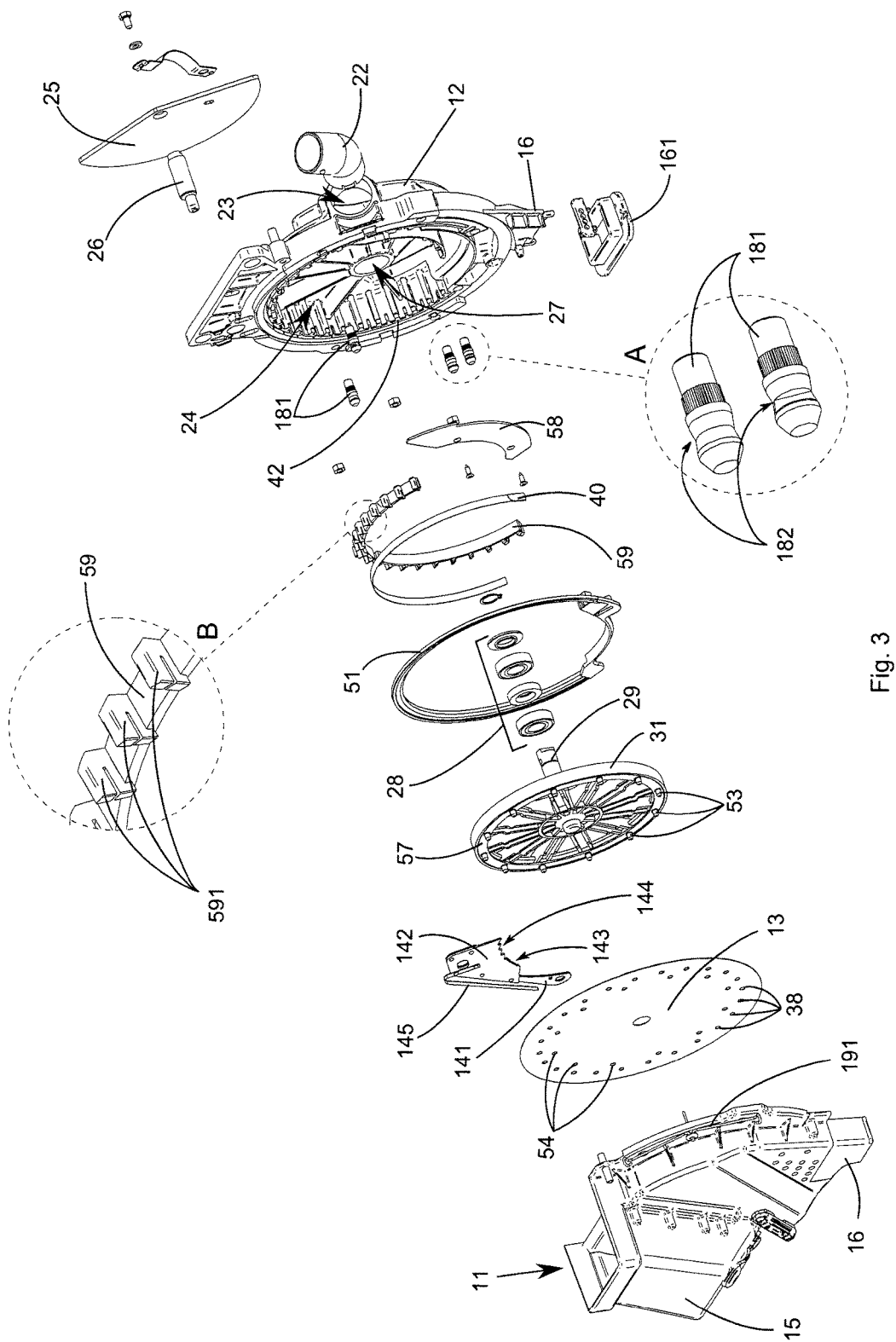
FIG. 3 is a perspective exploded view of the sowing machine of FIG. 1 and some details in larger scale of the driving disc.

As illustrated in FIG. 3, the surface of the air deviator 58 occupies only a part of the breadth of the internal circumference of the aspirating cavity.

Again inside the aspirating cavity 24, a curved sector 59 is installed, made of plastic or metal, which extends along a circumference for a breadth that is substantially complementary to the circumference of the air deviator 58. Protrusions 591 are present on a vertical surface of the sector 59, for example on the surface facing towards the outside of the distributor (FIG. 3), which protrusions 591 (FIG. 3, detail B) are located at determined intervals.

The radius of the circumference along which the sector 59 is installed is such that the position of a free end of the protrusions 591 coincides with the holes 38 made on the distribution disc 13.

The protrusions preferably have a rectangular section and terminate on the side facing towards the distribution disc 13 with a substantially chisel-shaped end exhibiting an inclined surface 592. The height of the protrusions 591 is such that the end of the inclined surface 592 brushes the surface of the distribution disc 13 so as to apply a thrust able to dislodge the seeds to the ends of the clogged seeds which project through the holes 38.

In the operating step, after having loaded the seeds in the cover 11, the distribution disc 13 is set in rotation (in a clockwise direction in FIG. 2) and the air aspirating device is activated. The aspiration of the air through conduit 22, the hole 23, the aspirating cavity 24 and the holes 38 is such that the seeds shaken by the pins 53 are retained on the disc in proximity of the holes 38 and set in rotation. When the seeds drawn by the distribution disc 13 pass through the toothed portion 143 of the selector device 14, the excess seeds are progressively removed from the disc 13, and if the selector device 14 is regulated adequately a single seed will be retained for each hole 38. The seeds will be retained on the distribution disc 13 up to when the respective hole reaches the discharge position, contiguous to the conduit 16 downstream of the aspirating cavity 24 where the seeds are no longer retained by the aspirating effect due to the presence of the air deviator 58.

Figure 5A:
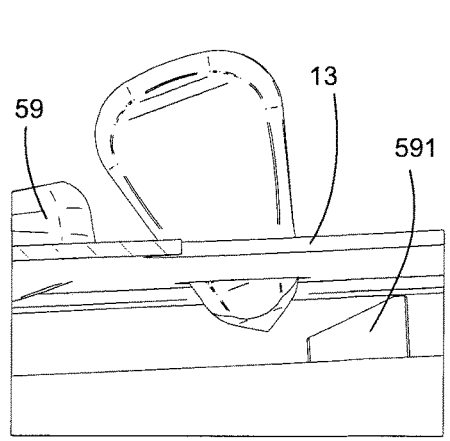
FIGS. 5A, 5B show details of the sowing machine of FIG. 1 in two steps of the releasing of a seed.

During regular functioning of the machine, it can happen that seeds of a particular shape engage so as to remain blocked in the respective hole 38 (FIG. 5A) notwithstanding the fact that the aspirating action is interrupted due to the presence of the air deviator 58. This drawback reduces the inefficiency of the working due to the drawbacks indicated in the foregoing.

Figure 5B:
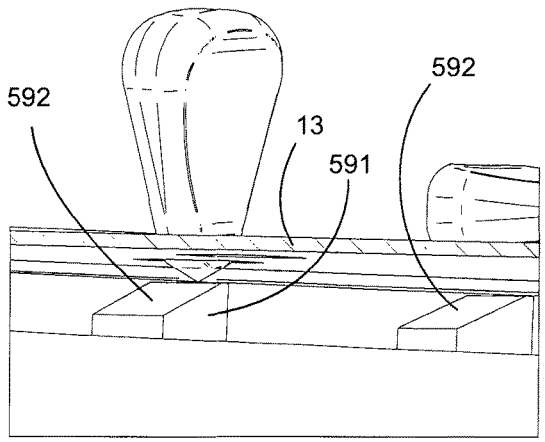

When this condition occurs the machines of the invention, differently from those of the prior art, are able to disengage the seeds blocked in the holes 38. The part of the seed trapped on the distribution disc 13 projects, through one of the holes 38, in the direction of the protrusions 591, as mentioned in the foregoing, brush, with the inclined plane 592 thereof, the surface of the distribution disc 13. As shown in FIG. 5B, due to the rotation of the distribution disc 13 the projecting part of a trapped seed goes into contact with the chisel-shaped surface 592 of one of the protrusions 591, receiving a push which causes the seed to exit from the hole. Further, the presence of the photocell detects the correct passage of the seeds. If the above is not true, a warning signal is emitted to advise the operator of an unexpected functioning, caused for example by the last of the seeds loaded in the hopper having passed through, or by the blocking of an internal organ which interrupts the flow of seeds. The ready signalling reduces the impact of further cycles for non-seeded areas or lost production.

It is clear from the preceding description that the invention attains the fixed objective of improving the efficiency of the distribution of single seeds. Thanks to the combined action of the protrusions 591 fixed on the sector 59 and the selector device 14 which regulate the number of seeds stopped by the air pressure created by the aspirator in proximity of the holes 38 on the distribution disc 13.

The design of the selector device 14, with respect to that of the like organs described in the prior art, enables simpler and easier operations for replacing the distribution discs.

Naturally the present invention is susceptible to numerous modifications or variants without forsaking the scope of protection, as defined by the appended claims.

Further, the materials and the equipment used for realising the present invention, as well as the forms and dimensions of the single components, can be the most suitable according to specific needs.

The invention claimed is:

1. A single seed dispenser (10) for an automatic sower comprising:

a cover (11) to contain seeds to be distributed, coupled to
a body (12) containing a cavity (24) in communication with an aspirator of the seeds through
a conduit (22) engaged in a hole (23) formed on said body (12),
a distribution disc (13) with holes (38, 54) contained in a compartment (20) delimited by said body (12) and by said cover (11);
a driving disc (31) joined by pins (53) to said distribution disc (13), both discs being put into rotation by means of
a shaft (29) driven by an actuator to control the rotation of the distribution disc (13) and the driving disc (31); and
a selector device (14) for the seeds pivoted on an edge of the body (12), wherein
the selector device (14) comprises a plate (142) which presents, on a side thereof facing a center of said distribution disc (13), at least two toothed portions (143, 144), having teeth of different sizes, wherein said selector device (14) is kept adherent to said distribution disc (13) by a spring (145) secured with a first end to said plate (142) and with a second end pushing against said cover (11); and
a curved sector (59) is mounted against a surface of the distribution disc (13) opposite the plate (142) and is provided with protrusions (591) having an inclined surface (592) facing the distribution disc (13) at the holes (38) of the distribution disc (13).

2. A single seed dispenser (10) according to claim 1, wherein a position of said selector device (14) with respect to said distribution disc (13) is set by means of an eccentric pin (26) rotatable using a manual adjustment arm (25).

3. A single seed dispenser (10) according to claim 2, wherein said manual adjustment arm (25) bears a graduated scale indicating an inclination set on said selector device (14).

4. A single seed dispenser (10) according to claim 1, wherein a gasket (51) interposed between said body (12) and said distribution disc (13) is formed in one or more pieces in order to create a single plane so as to ensure airtightness and to reduce friction.

5. An automatic pneumatic sower equipped with a single seed dispenser (10) according to claim 1.

6. A single seed dispenser (10) according to claim 1, wherein said body (12) and said cover (11) are coupled to one another by means of locking pins (181) which engage respective flanges (18, 19) and are urged to close by springs (191) engaged with grooves (182) made at a free end of said locking pins (81).

7. A single seed dispenser (10) for an automatic sower comprising:
a cover (11) to contain seeds to be distributed, coupled to
a body (12) containing a cavity (24) in communication with an aspirator of the seeds through
a conduit (22) engaged in a hole (23) formed on said body (12),
a distribution disc (13) with holes (38, 54) contained in a compartment (20) delimited by said body (12) and by said cover (11);
a driving disc (31) joined by pins (53) to said distribution disc (13), both discs being put into rotation by means of
a shaft (29) driven by an actuator to control the rotation of the distribution disc (13) and the driving disc (31); and
a selector device (14) for the seeds pivoted on an edge of the body (12), wherein
the selector device (14) comprises a plate (142) which presents, on a side thereof facing a center of said distribution disc (13), at least two toothed portions (143, 144), having teeth of different sizes, a position of said selector device (14) with respect to said distribution disc (13) is set by means of an eccentric pin (26) rotatable using a manual adjustment arm (25) and
a curved sector (59) is mounted against a surface of the distribution disc (13) opposite the plate (142) and is provided with protrusions (591) having an inclined surface (592) facing the distribution disc (13) at the holes (38) of the distribution disc (13)
wherein said manual adjustment arm (25) bears a graduated scale indicating an inclination set on said selector device (14).

8. A single seed dispenser (10) according to claim 7, wherein said selector device (14) is kept adherent to said distribution disc (13) by a spring (145) secured with a first end to said plate (142) and with a second end pushing against said cover (11).

9. An automatic pneumatic sower equipped with a single seed dispenser (10) according to claim 7.

10. A single seed dispenser (10) for an automatic sower comprising:
a cover (11) to contain seeds to be distributed, coupled to
a body (12) containing a cavity (24) in communication with an aspirator of the seeds through
a conduit (22) engaged in a hole (23) formed on said body (12),
a distribution disc (13) with holes (38, 54) contained in a compartment (20) delimited by said body (12) and by said cover (11);
a driving disc (31) joined by pins (53) to said distribution disc (13), both discs being put into rotation by means of
a shaft (29) driven by an actuator to control the rotation of the distribution disc (13) and the driving disc (31); and
a selector device (14) for the seeds pivoted on an edge of the body (12), wherein
the selector device (14) comprises a plate (142) which presents, on a side thereof facing a center of said distribution disc (13), at least two toothed portions (143, 144), having teeth of different sizes and
a curved sector (59) is mounted against a surface of the distribution disc (13) opposite the plate (142) and is provided with protrusions (591) having an inclined surface (592) facing the distribution disc (13) at the holes (38) of the distribution disc (13) and wherein said body (12) and said cover (11) are coupled to one another by means of locking pins (181) which engage respective flanges (18, 19) and are urged to close by springs (191) engaged with grooves (182) made at a free end of said locking pins (81).

11. An automatic pneumatic sower equipped with a single seed dispenser (10) according to claim 10.

* * * * *